US008365095B2

(12) United States Patent
Bansal et al.

(10) Patent No.: US 8,365,095 B2
(45) Date of Patent: *Jan. 29, 2013

(54) SYSTEM AND METHOD FOR ASSIGNING AND SCHEDULING ACTIVITIES

(75) Inventors: Harish Bansal, Fremont, CA (US); Olivier Delerm, San Francisco, CA (US); Atul Purohit, Fremont, CA (US); Chrisopher Scott Nash, Emeryville, CA (US)

(73) Assignee: Siebel Systems, Inc., San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/871,548

(22) Filed: Aug. 30, 2010

(65) Prior Publication Data

US 2010/0325582 A1    Dec. 23, 2010

Related U.S. Application Data

(60) Division of application No. 10/112,991, filed on Mar. 28, 2002, now Pat. No. 7,788,598, which is a continuation of application No. 09/810,007, filed on Mar. 16, 2001, now abandoned.

(51) Int. Cl.
 *G06F 3/048* (2006.01)
(52) U.S. Cl. ........................................ 715/810; 715/963
(58) Field of Classification Search .................. 715/810, 715/963
 See application file for complete search history.

(56) References Cited

U.S. PATENT DOCUMENTS

| | | | |
|---|---|---|---|
| 5,111,391 A | 5/1992 | Fields et al. | |
| 5,117,353 A | 5/1992 | Stipanovich et al. | |
| 5,323,314 A | 6/1994 | Baber et al. | |
| 5,659,768 A * | 8/1997 | Forbes et al. | 715/201 |
| 5,709,410 A | 1/1998 | Reeves, Jr. | |
| 5,819,263 A | 10/1998 | Bromley et al. | |
| 5,970,466 A | 10/1999 | Detjen et al. | |
| 6,049,776 A | 4/2000 | Donnelly et al. | |
| 6,678,671 B1 | 1/2004 | Petrovic et al. | |
| 2002/0016729 A1 | 2/2002 | Breitenbach et al. | |
| 2002/0131572 A1 | 9/2002 | Paradis | |

OTHER PUBLICATIONS

"Appointment Scheduler," Jul. 28, 2000. CMA Consulting Services. Marmel, Elaine. Microsoft Project 2000 Bible, 2000, IDG Books Worldwide, Inc., pp. 109-129.

* cited by examiner

*Primary Examiner* — Namitha Pillai
(74) *Attorney, Agent, or Firm* — Campbell Stephenson LLP

(57) ABSTRACT

Techniques to facilitate assignment and scheduling of activities. In accordance with a method, a chart showing a calendar of schedule for a number of available resources is provided in a first frame (or window) in a user interface menu, and a number of objects representative of a number of unplanned activities are provided in a second frame. A selection for an unplanned activity in the second frame (or a planned activity in the first frame) is received and, in response, selected ones of a number of objects in the chart are highlighted based on the selected activity. A request to assign the selected activity to a selected resource and to schedule the selected activity for a particular time duration is thereafter received. The requested assignment and scheduling may be accepted or rejected based on the requirements of the selected activity and the capabilities of the selected resource.

21 Claims, 9 Drawing Sheets

SYSTEM AND METHOD FOR ASSIGNING AND SCHEDULING ACTIVITIES

CROSS-REFERENCE TO RELATED APPLICATIONS

This application is a divisional application of U.S. application Ser. No. 10/112,991, filed Mar. 28, 2002 (now U.S. Pat. No. 7,788,598), naming inventors Harish Bansal, Olivier Delerm, Atul Purohit, and Chrisopher Scott Nash, and titled "System and Method for Assigning and Scheduling Activities," which is a continuation of U.S. application Ser. No. 09/810,007, naming inventors Harish Bansal, Olivier Delerm, Atul Purohit, and Chrisopher Scott Nash, and titled "System and Method for Assigning and Scheduling Activities," filed Mar. 16, 2001 (now abandoned). Each of the aforementioned applications is hereby incorporated herein by reference in its entirety for all purposes.

BACKGROUND OF THE INVENTION

The present invention relates generally to computer processing, and more particularly to techniques to facilitate the assignment and scheduling of activities.

Assigning and scheduling activities are a ubiquitous challenge faced by many industries and organizations. In many service-oriented industries, calls may be received from customers requesting certain tasks to be performed. These tasks may relate to installation, repair, or maintenance of products, or may be for various types of services to be rendered. The calls are typically logged (e.g., by a front-end system such as a call center) and activities are generated for the tasks. The activities are thereafter assigned to appropriate personnel and scheduled to be performed.

A dispatch operator (or dispatcher) designated to assign and schedule the activities may be faced with a myriad of requirements for the activities. For example, an activity may require a field service personnel with a particular skill, a specific set of parts, and so on. Each activity typically further needs to be performed at a particular site and within a particular time window. The available personnel may have different skills and inventory of parts, and may also operate based on different schedules and in different territories. At a minimum, the dispatcher needs to assign the activities to the personnel capable of performing the activities. For better utilization of the available resources, the activities should further be assigned and scheduled to minimize overhead, such as that associated with traveling between activities. And to improve customer satisfaction, the activities should be scheduled within any given time constraints, which may be imposed, for example, by service agreements with the customers.

As can be seen, the task of assigning and scheduling activities to efficiently utilize the available resources can be daunting. The challenge often magnifies as the number of activities, requirements, and/or personnel increases. Thus, techniques that can assist a dispatcher in assigning and scheduling activities to achieve the desired goals are highly desirable.

SUMMARY OF THE INVENTION

The invention provides techniques to enable a dispatcher to select and view information related to activities and available resources, and to quickly, easily, and accurately assign and schedule activities. The tools and features provided by the invention allow the dispatcher to perform the assignment and scheduling tasks in an efficient manner and to achieve improved resource utilization.

A specific embodiment of the invention provides a method for assigning and scheduling activities, which is implemented in a computer system. In accordance with the method, a chart showing a calendar of schedule for a number of available resources is provided in a first frame (or window) in a user interface menu, and a number of objects representative of a number of unplanned activities (i.e., not yet assigned and scheduled) are provided in a second frame. A selection for an unplanned activity in the second frame (or a planned activity in the first frame) is received and, in response, selected ones of a number of objects in the chart are highlighted based on the selected activity. A request to assign the selected activity to a selected resource and to schedule the selected activity for a particular time duration is thereafter received. The requested assignment and scheduling may be accepted or rejected based on the requirements of the selected activity and the capabilities of the selected resource.

The selection and request may be received via actions performed on a mouse associated with the computer system, which may be used to perform a "drag-and-drop" action on an object representative of the selected activity. Various other features are also provided to facilitate the assignment and scheduling of the selected activity, as described in further detail below.

The invention further provides other methods, user interface menus, software codes, and systems capable of implementing various aspects, embodiments, and features of the invention, as described in further detail below.

The foregoing, together with other aspects of this invention, will become more apparent when referring to the following specification, claims, and accompanying drawings.

DESCRIPTION OF THE SPECIFIC EMBODIMENTS

Figure 1:
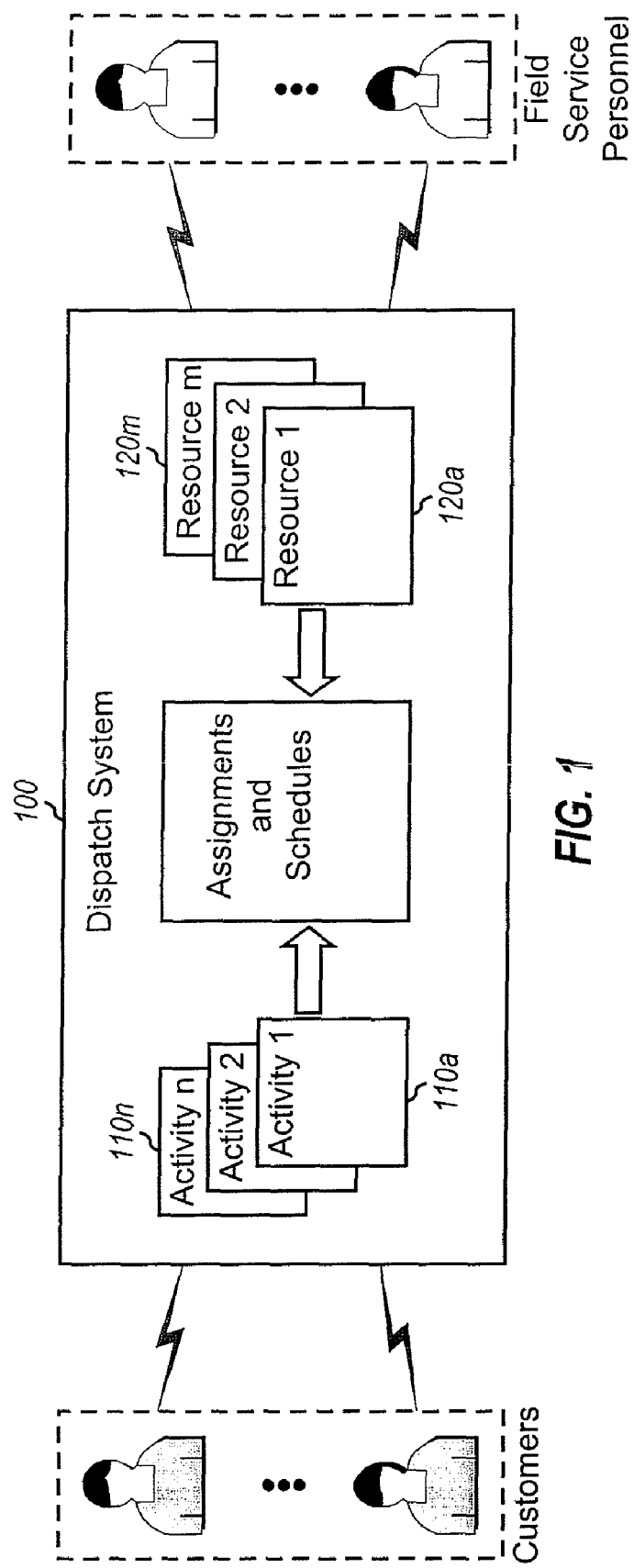
FIG. 1 is a diagram of a simplified view of a dispatch system capable of implementing various aspects of the invention.

FIG. 1 is a diagram of a simplified view of a dispatch system 100 capable of implementing various aspects of the invention. Dispatch system 100 receives information for activities 110 (e.g., for a number of customers) and is also provided with information for resources 120 (e.g., associated with a number of field service personnel). Each activity 110 may specify a particular task to be performed and the location and times at which the task may be performed. Performance of an activity may require a particular skill, a particular set of parts, and possibly other requirements, which are all typically specified by the activity. Each resource 120 may correspond to a particular field service personnel, and may include information related to the personnel's skill, time of availability, coverage area, and so on. The activities and resources may be provided to dispatch system 100 via numerous means, some of which are described below.

Dispatch system 100 provides tools to organize and display the activities and resources, and further provides tools to enable efficient assignment and scheduling of activities based on the available resources. The resultant assignments and schedules may be provided to the affected customers and field service personnel. Dispatch system 100 further provides tools to quickly and easily modify assignments and schedules to accommodate changes.

Dispatch system 100 may be used for numerous industries and organizations. As an example, the activities may relate to the installation, repair, or service of a particular hardware (e.g., a computer related product, appliance, or equipment).

In an embodiment, activities are categorized into two groups—planned activities and unplanned activities. Unplanned activities are those received by the dispatch system but not yet assigned and scheduled. In an embodiment, all activities are categorized as unplanned as they are received by the dispatch system. For some implementations, certain activities may be received by the dispatch system and categorized as planned if they have already been assigned and scheduled.

An unplanned activities may thereafter be assigned to one (or possibly multiple) field service personnel and scheduled to be performed at a designated time. Upon being assigned and scheduled, the activity is categorized as planned. A planned activity may also be (1) re-assigned and/or re-scheduled (e.g., due to changes) or (2) de-assigned and de-scheduled, in which case it is re-categorized as unplanned. An activity may thus move freely from one category to another in the dispatch system. Different and/or additional categories may also be defined and are within the scope of the invention.

Activities are typically assigned and scheduled based on a number of parameters. Some of these parameters may relate to the capabilities needed to perform an activity, such as the required skill of the field service personnel, the required parts, and so on. Some parameters may relate to requirements imposed on the activity, such as the time window during which the activity should or must be performed. And some other parameters may relate to factors used to increase efficiency and improve resource utilization, such as the territory (or coverage area) of the field service personnel. Numerous other parameters may also be defined. These parameters, their presentation by the dispatch system, and their impact on the assignment and scheduling of activities are described in further detail below.

Dispatch system 100 may be designed to provide a number of features and tools used to view, assign, and schedule activities. The features may include:

View a hierarchical display of unplanned activities (i.e., not yet assigned and scheduled), together with various system-defined entities required for, recommended for, or otherwise associated with such activities.

View a graphical display showing a time period (e.g., a full week) of schedule for all personnel eligible and available for assignment of a selected activity. Various features and data in the display may be highlighted for ease of viewing, such as previously scheduled activity times, planned non-working times of personnel, and so on. The graphical display may support a vertical and/or horizontal scroll bar and different scales (day, week and month) for the timeline.

Constrain the graphical display to show data by territory, expertise, and/or parts resulting from a system search for all personnel eligible for assignment of a selected activity. This filtering feature reduces clutter and presents relevant information.

Use of a "drag-and-drop" technique to (1) assign and schedule an unplanned activity in the system, (2) re-assign and/or re-schedule a planned activity, and (3) de-assign and de-schedule an planned activity.

Refresh any one or more displays on a main menu (or dispatch screen) at any time to make sure that the contents of the refreshed screen reflect the current contents of a main (central) database. The refresh may be automatically performed (e.g., with selectable time interval between refreshes) and/or upon request.

Other features of the dispatch system are described in further detail below.

Figure 2:
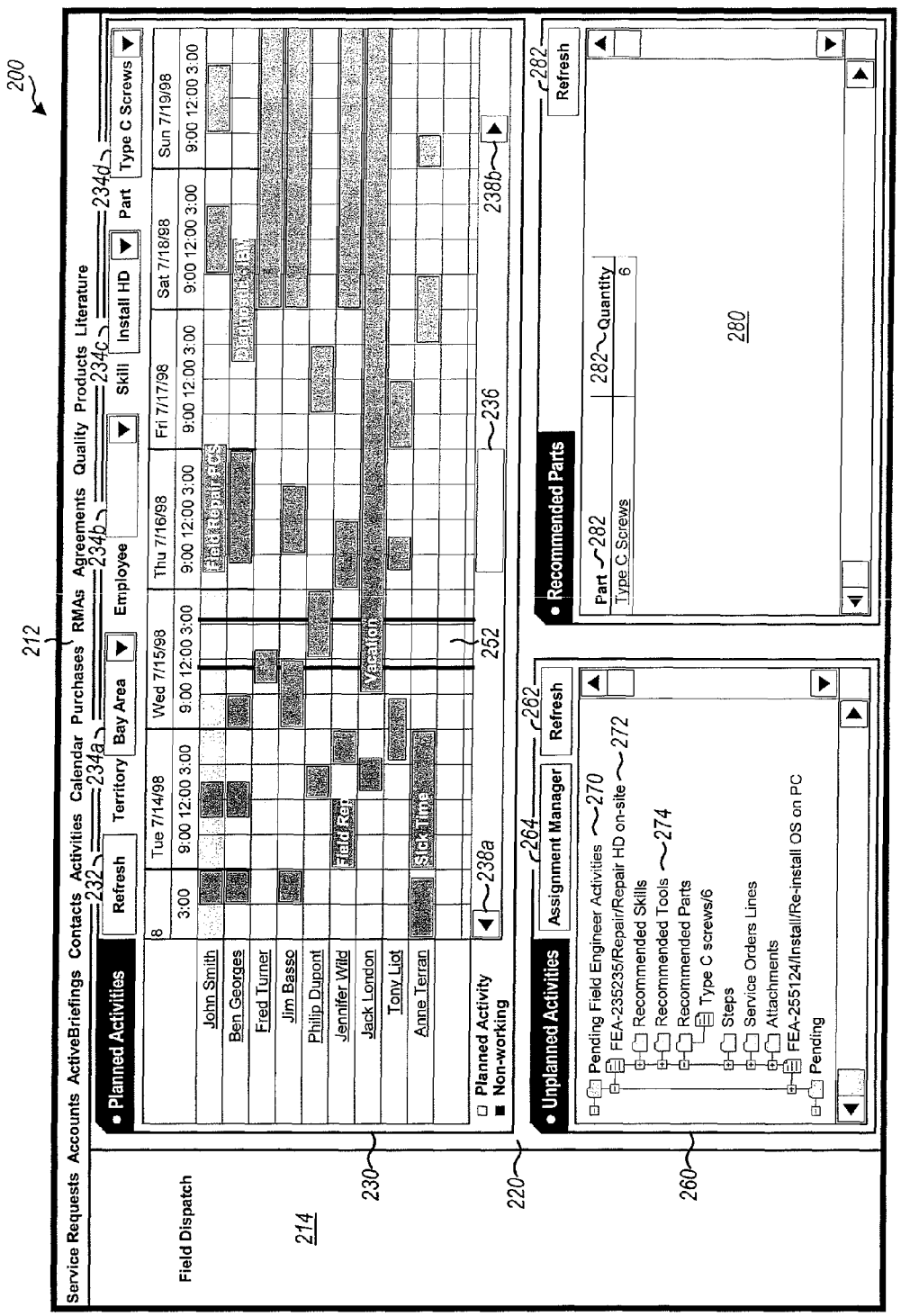
FIG. 2 illustrates a user interface menu (or a dispatch screen) that may be used to display information for activities and resources, and to facilitate the assignment and scheduling of activities, in accordance with a specific embodiment of the invention.

FIG. 2 illustrates a user interface menu 200 (also referred to as a dispatch screen) that may be used to display information for activities and resources, and to facilitate the assignment and scheduling of activities, in accordance with a specific embodiment of the invention. Dispatch screen 200 may be used by the dispatcher to (1) display available and pertinent information in a manner to allow the dispatcher to make prompt and cost-effective decisions for assignments of activities to field service personnel, (2) provide extensive capabilities to add, change, and schedule assigned activities, and (3) for other functions.

Dispatch screen 200 includes main pull-down menus 212, an application menu area 214, and a main display area 220. Main pull-down menus 212 may be used to invoke various applications, functionality, and features provided by the overall system. In such a design, the dispatch system may represent just one of multiple available applications. Application menu area 214 may be used to display icons and/or text representing various functions, features, and/or views available for the selected application. In the embodiment shown in FIG. 2, the dispatch application is selected for display.

Main display area 220 may be used to present information for the selected application. In the specific embodiment shown in FIG. 2, main display area 220 presents information for the dispatch application and includes a frame 230 used to display planned activities, a frame 260 used to display unplanned activities, and a frame 280 used to display selected information (e.g., recommended parts). Different, fewer, and/or greater number of frames (or windows) may be selected for display in main display area 220. Also, the frames may be used to present different information and may have different designs and layouts. These and other variations are within the scope of the invention.

As used herein, a "frame" is a display window used to present a particular collection of data (e.g., for planned activities, unplanned activities, and so on). A frame typically presents data in a specific layout and design, and multiple frames may be designed and used to display the same collection of data. A frame may be defined to have any size and shape, although a rectangular shape is typically used. Each frame may be rendered by a corresponding applet, which is a high-level programming object. A "view" is a collection of frames, and each view typically includes one or more frames. A view typically represents a specific layout and design for displaying one or more collections of data. A screen is a collection of views, such as dispatch screen 200, and typically includes one or more views.

A frame typically includes a number of "fields". Each field may represent a particular data type, a parameter used for assigning and scheduling activity, a particular action that may be performed in the frame, and so on. Each field is typically represented with an "object", which may be a button, a list box, a display region, or some other representation.

A number of frames and views may thus be defined for displaying data that may be used for assigning and scheduling activities. The specific design of the frames and views may be based on various factors, such as the specific application (e.g., industry, organization, and so on) for which the dispatch system is used, individual preferences, and so on. Each such application may have its own requirements, in which case specific frames and views may be defined to meet the specific requirements of that application. For example, activities and resources for a computer repair shop are likely to be different from those of a flower delivery service, and different frames and views may be generated for these different types of applications.

For clarity, various aspects of the invention are described for a specific application in which activities are assigned and scheduled based on a set of parameters—(1) the skill of the field service personnel, (2) the territory in which the field service personnel is located, (3) the parts required for the activity, (4) the time window during which the activity should or must be performed, and possibly others. A set of frames is then provided to support the application. Specific designs of some of these frames are described below.

FIG. 2 shows a Planned Activities frame 230, in accordance with a specific embodiment of the invention. Planned Activities frame 230 includes a Refresh button 232 used to refresh of the contents of frame 230. A refresh occurs when Refresh button 232 is clicked, and may be used to ensure that the data displayed in the frame corresponds to the current data in the main database.

Planned Activities frame 230 further includes a number of list boxes 234 corresponding to a number of parameters that may be invoked in assigning and scheduling activities. In the embodiment shown, a Territory list box 234a, a Skill list box 234c, and a Part list box 234d are provided in frame 230. Different and/or additional list boxes, or other representations, may also be used to present other parameters used for assigning and scheduling activities, and this is within the scope of the invention.

Territory list box 234a lists the territories defined for the dispatch system. A value of "None" may be selected for this field to direct the dispatch system to exclude this parameter as a criterion in a search for field service personnel qualified to perform an activity to be assigned. If a non-void value is selected for this field and then Refresh button 232 is clicked, the dispatch system displays a list of field service personnel whose territory corresponds to the selected territory.

Employee list box 234b lists the field service personnel defined available for the dispatch system. A value of "None" may be selected for this field to direct the dispatch system to exclude this parameter as a search criterion. If any value other than None is selected for this field and then Refresh button 232 is clicked, the dispatch system displays a list of field service personnel including the one selected in list box 234b.

Skill list box 234c lists the skills defined for the dispatch system. Similarly, a value of "None" may be selected for this field to direct the dispatch system to exclude this parameter as a search criterion. If any value other than None is selected for this field and then Refresh button 232 is clicked, the dispatch system displays a list of field service personnel designated to the system as possessing the selected skill.

Part list box 234d lists the parts defined for the dispatch system. A value of "None" may be selected to exclude this parameter as a search criterion. If any value other than None is selected and then Refresh button 232 is clicked, the dispatch system displays a list of field service personnel recorded by the system as being in possession of the selected part in their inventory.

Other regions and fields in Planned Activities frame 230 are described in further detail below.

FIG. 2 also shows an Unplanned Activities frame 260, in accordance with a specific embodiment of the invention. Unplanned Activities frame 260 includes a Refresh button 262 used to refresh of the contents of frame 260. Unplanned Activities frame 260 further includes an Assignment Manager button 264 used to invoke an Assignment Manager popup view (not shown in FIG. 2). In an embodiment, if an activity is selected and the Assignment Manager is invoked (by clicking on button 264), the Assignment Manager popup view is pre-filled with data for eligible resources for the selected activity (i.e., field service personnel capable of performing the selected activity). This feature can assist the dispatcher decide how to assign and (optionally) schedule the activity. Other regions and fields in Unplanned Activities frame 260 are described in further detail below.

FIG. 2 further shows a Recommended Parts frame 280, in accordance with a specific embodiment of the invention. Recommended Parts frame 280 includes a Refresh button 252 used to refresh of the contents of frame 280, a Part field 282, and a Quantity field 284. Part field 282 lists the part(s), if any, designated to the dispatch system as required or recommended for use in the selected activity. Quantity field 284 lists the quantity of the corresponding recommended part in Part field 282.

A Recommended Skills frame (not shown in FIG. 2) includes a Skill frame and a Skill Item frame. The Skill frame lists the skill categories, if any, designated to the dispatch system as required for the performance of the selected activity (e.g., install hard disk, language, and so on). The Skill Item frame includes an Area field and an Expertise field. The Area field lists the skill area(s), if any, designated to the system as required for the performance of the selected activity (e.g., SCSI hard disks, Spanish, and so on). And the Expertise field lists the level of expertise in the corresponding skill area (e.g., expert, certified, proficient, and so on).

A Recommended Tools frame (not shown in FIG. 2) includes a Refresh button and a Tool field. The Tool field lists the tool(s), if any, designated to the system as required or recommended for the performance of the selected activity.

A Step frame (not shown in FIG. 2) includes a Refresh button, a Type field, a Step field, and a Sequence field. The Type field lists the type (as defined to the system) to which the current step belongs. The Step field lists the system or user defined name of the current step. And the Sequence field lists an ordinal integer designating the order in which the step is to be performed in relation to other steps for the activity.

A Service Orders Lines frame (not shown in FIG. 2) includes a Refresh button, a Product field, a Quantity field, a Type field, and a Status field. The Product field lists the product(s), if any, designated in connection with this activity by the associated line of the originating service order. The Quantity field lists the quantity of the designated product, if any, specified by the associated line of the originating service order. The Type fields lists the type selected for the associated line of the originating service order. And the Status field lists the status selected for the associated line of the originating service order.

An Attachments frame (not shown in FIG. 2) includes a Refresh button, an Attachment field, and a Type field. The Attachment field lists the name of an attachment, if any, associated with the current activity. The Type field lists the type of the associated attachment, if any.

Unplanned Activities Frame

Since activities are initially categorized as unplanned in most instances, Unplanned Activities frame 260 is typically the starting point for assigning and scheduling activities. In the embodiment shown in FIG. 2, Unplanned Activities frame 260 displays a "tree control" in which the highest level includes a number of folders 270 (e.g., Pending Field Engineer Activities, Pending) for different types of pending activities. Each pending activity folder 270 includes zero or more unplanned activities 272 categorized under the activity type associated with that folder.

In an embodiment, each pending activity 272 is associated with a set of folders 274 corresponding to parameters and other information that may be invoked for assigning and scheduling activities. Each folder 274 may be associated with a respective frame, and the frames for the six folders 274 for an unplanned activity are briefly described above. In an embodiment, the opening of a particular folder 274 (e.g., by clicking once on the folder) causes a frame (e.g., frame 280) to be generated or refreshed to display the frame associated with the opened folder, in which case the title in the frame also changes correspondingly. Frame 280 then displays one line item for each unit in that opened folder 274. In the example shown in FIG. 2, the folder for Recommended Parts is opened and results in the display of the corresponding Recommended Parts frame 280.

Refresh button 262 located in the upper right corner of frame 260 may be clicked at any time to ensure that the contents of the frame reflect the current state of the database. Clicking Refresh button 262 may be appropriate if the dispatcher knows that a change recently made to another frame (e.g., Planned Activities frame 230) has changed the data underlying Unplanned Activities frame 260.

Selecting a particular activity 272 and clicking on an Assignment Manager button 264 invokes an Assignment Manager popup view for the selected activity. The popup view provides the list of eligible resources and their scores based on the requirements of the activity. The Assignment Manager may further invoke an assignment engine used to facilitate the assignment and scheduling of activities. The dispatcher may employ the Assignment Manager to make a cost-effective decision to assign and schedule the selected activity.

Planned Activities Frame

In an embodiment, Planned Activities frame 230 displays a current schedule for the available (or selected) field service personnel using a Gantt chart. Other types of chart may also be used and are within the scope of the invention. The Gantt chart displays data on x and y-axis to show planned activities versus time. The two top rows of the chart display headers with date and time information. Each data row below the header rows may be used to display the schedule of a respective field service personnel. The data rows are based on the selected criteria (e.g., Territory, Employee, Skill, Part, and so on). The height of the data rows is typically fixed (e.g., by a default value) and the number of rows may be determined by the size of the display frame. The number of rows and the row height may also be set by properly setting the Rows property in an Option menu.

The first column in the chart is a header column used to identify the field service personnel. Each column to the right of the header column is a data column used to display assignment and scheduling information. Each data column covers a particular time period (e.g., 3 hours for the embodiment shown in FIG. 2). The header column is typically wider compared to the data columns, and displays the names of the field service personnel in a text format for ease of viewing. The width of the data columns is typically fixed (e.g., by a default value), and the chart may be configured to display a particular time window (e.g., one week) of a calendar. The number of columns is typically determined by the size of the display frame. The dispatcher may configure the chart (e.g., via the Option menu) to display a different time window (e.g., different number of days), in which case the time interval covered by each data column is correspondingly and automatically changed.

Each cell in the chart is formed by the intersection area between one row and one column. The cells in the first (header) column are typically able to accept data and display it "as-is". Cells in the data columns may be configured to display data using colored boxes with outline. The data displayed in these cells may span multiple cells in the same row. In one embodiment, data is constrained from spanning multiple cells in the same column. Alternatively, data may be allowed to span multiple cells in the same column (e.g., if two or more field service personnel are needed or recommended for a particular activity).

A Horizontal scroll bar 236 is provided to allow the dispatcher to span (or scan) across columns in the grid portion of the chart, i.e., the data columns. A Vertical bar may also be provided, if needed, to allow the dispatcher to scroll through the available field service personnel across rows, except the header rows. The horizontal and vertical scroll bars are made visible on the frame based on the amount of data to be displayed. It more data is available for displayed, then these scroll bars are made visible on the corresponding portions of the frame.

Various schemes may be used to present data in the grid portion of the chart (i.e., the data portion, except the header rows and column). In one scheme, data is displayed as solid colored boxes with outline. Each box represents a particular "event", which may be an activity that has been assigned and scheduled or some other information (e.g., non-schedulable or non-working times for a field service personnel). The outline of a box typically corresponds to the time duration for the associated event (e.g., the scheduled time for an activity). The dispatcher may be able to expand or shrink the size of a box by using the mouse (e.g., by clicking on an edge of the box and dragging the edge).

The color of each box may be based on a particular color coding scheme that uses different colors to differentiate between different types of event (e.g., different types of activity). For example, non-schedulable times for field service personnel may be represented with boxes of one color (e.g., orange), scheduled activities may be represented with boxes of another color (e.g., green) or boxes of different colors to represent their status and priority, and so on. The color scheme may be configurable to suit the preferences of the individual dispatcher.

The data boxes may also be configured to display additional information related to the associated events. The additional information may be in text form and may be a concatenated string descriptive of the activity type, status, account, description, and so on, or a combination thereof. If the text is too long to fit in a box, then it may be abbreviated or truncated and the last portion may be replaced by " . . . " (e.g., "Field Repair/Activ . . . "). The boxes may also be configured such that full text is displayed for an event when the cursor is placed over the associated box (e.g., without clicking the mouse button).

Figure 3A:
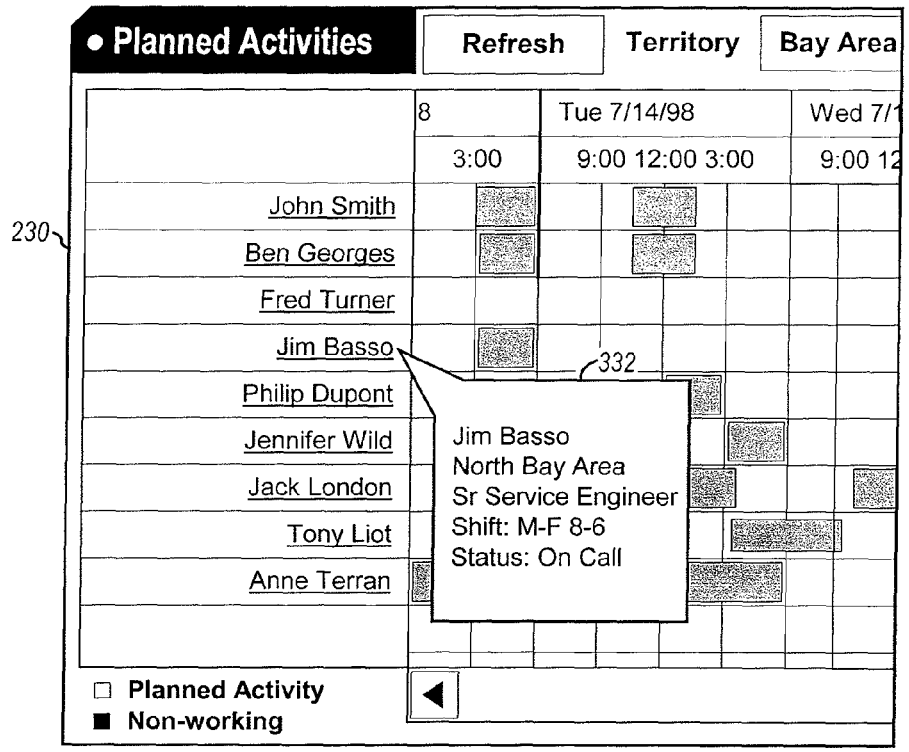
FIGS. 3A and 3B illustrate the presentation of additional information on the dispatch screen based on interaction with a dispatcher.
Figure 3B:
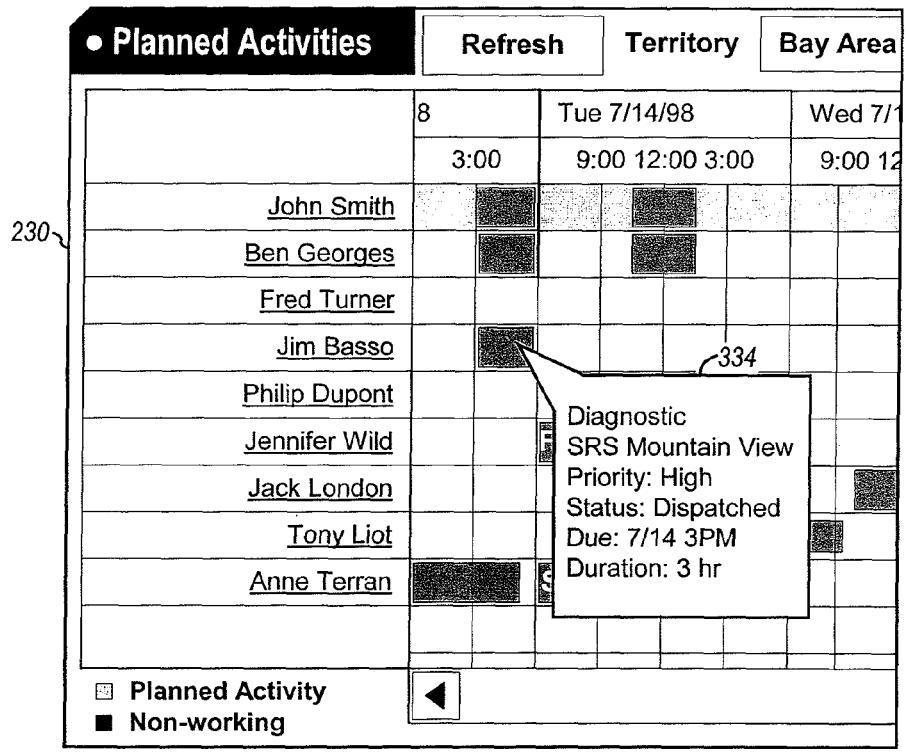

FIGS. 3A and 3B illustrate the presentation of additional information in Planned Activities frame 230 based on interaction with the dispatcher. In FIG. 3A, placement of the mouse over an entry in the header column for a short time period (e.g., half a second) causes a bubble 332 (i.e., a popup window) to appear next to the entry. Bubble 332 displays additional information about the selected entry. In an embodiment, a single click on the entry may cause an Employee Administration view to be displayed.

FIG. 3B shows the presentation of additional information for an event (e.g., an activity) in Planned Activities frame 230. For each data cell in the chart associated with information, placement of the mouse over the cell activates a bubble 334 to appear next to the cell. Bubble 334 displays additional information about that cell, which typically relates to an activity assigned to that cell or some other event (e.g., vacation or sick time). In an embodiment, a (double) click on the data cell causes an All Activity view to be displayed in place of the dispatch screen.

Figure 3C:
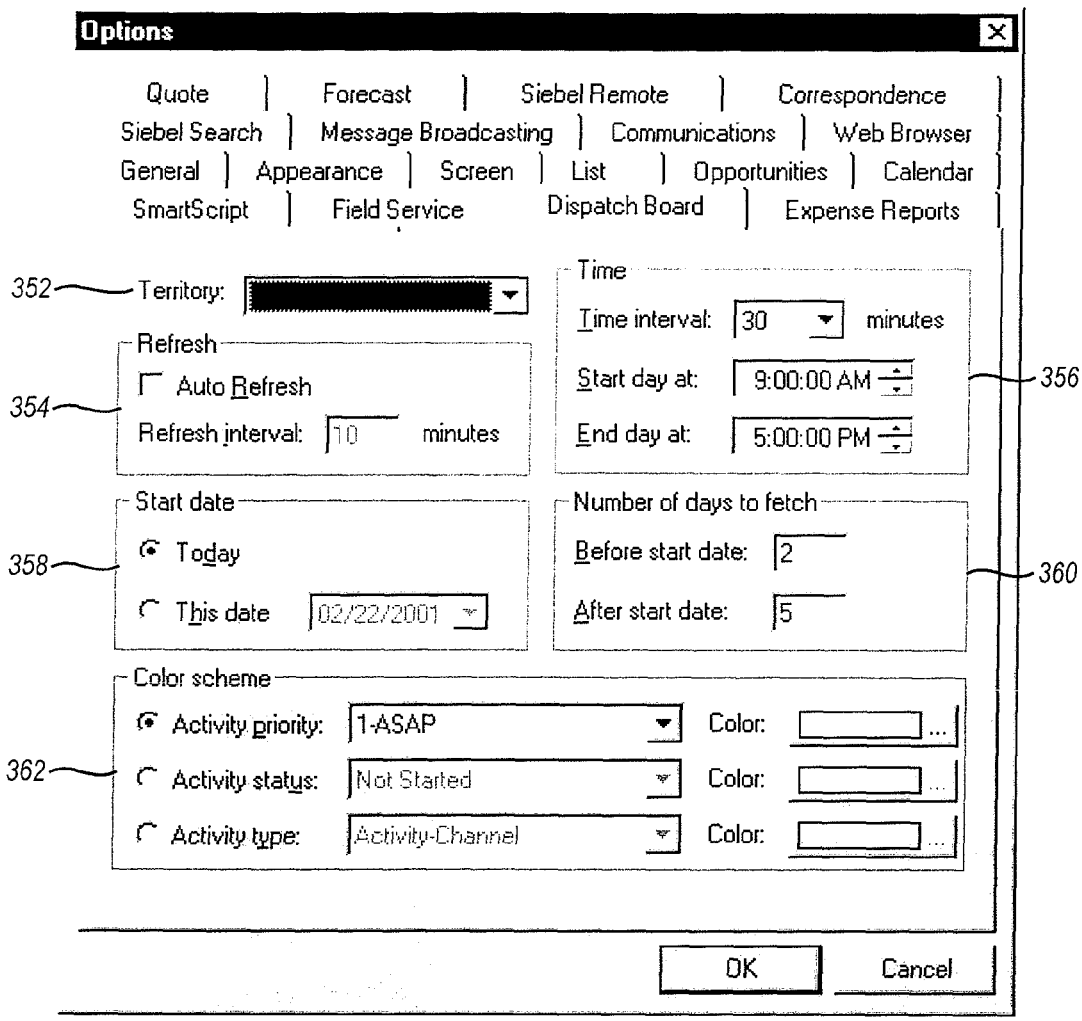
FIG. 3C shows an embodiment of an Option menu used to configure various features of the dispatch screen.

FIG. 3C shows an embodiment of the Option menu used to configure various features of the dispatch screen. In this embodiment, the dispatcher is able to (1) select the territory via a list box 352, (2) enable and disable automatic refresh of the chart and select the refresh time interval via a control box 354, (3) select the time interval for the chart and the working hours for a day via a control box 356, (4) select the start date for the chart via a control box 358, (5) select the number of days of data to fetch for the chart via a control box 360, and (7) select the color scheme for the boxes in the chart via a control box 362. Other Option menus may be designed and other parameters may be made configurable, and these are within the scope of the invention.

Assignment and Scheduling

The chart layout and the novel presentation of pertinent information (along with other easily accessible information) in frame 230 provide an environment whereby activities may be quickly, easily, and accurately assigned and scheduled. To assign and schedule a particular unplanned activity 272 in frame 260, the dispatcher simply moves the cursor over to an object representing the unplanned activity and selects it by depressing the mouse button. The dispatcher can then drag the object over to a data cell in the chart on frame 230 corresponding to the appropriate field service personnel and for the appropriate time. The dispatcher can then both assign the activity to the field service personnel and schedule the activity, at the same time, by simply dropping the object (e.g., releasing the mouse button). If the location where the dispatcher drops the object is appropriate (i.e., meeting the requirements for the activity), then the chart accepts the drop and the dispatch system performs the necessary post processing. The "drag-and-drop" feature thus provides a simple and effective technique for assigning and scheduling activities.

As an alternative or to augment the drag-and-drop technique, the dispatcher may select values for one or more list boxes 234 in Planned Activities frame 230 in order to search for a list of qualifying field service personnel. Each list box 234, when activated, may be designed to list the available selections or to display a window enabling multiple selections. Each list box 234 typically includes a value "None" that directs the dispatch system to exclude the list box value from the search criteria. In an embodiment, selecting an unplanned activity, as appropriate, propagates values for that activity to the fields corresponding to the list boxes. In this manner, an automatic search is performed for each selected activity. However, the dispatcher may override any or all such fields (e.g., by setting them to "None").

As shown in FIG. 2, an activity may span multiple data cells horizontally. In an embodiment, the cell where the activity is dropped is the starting cell, and a box is generated for as many cells as needed corresponding to the duration of the activity. In an embodiment, if the duration of the activity is shorter than the time period for the cell, a box is generated for the entire cell. In an embodiment, an activity may also span multiple data cells vertically (e.g., if two field service personnel are required to perform the activity). Moreover, a single data cell may include multiple boxes for multiple activities. This situation may arise, for example, if multiple activities are being performed at the same site at or near the same time, or if the activities are short in duration relative to the time interval for the data cell. Multiple boxes in a data cell may be represented by various manners such as, for example, a different color box denoting multiple activities, a box with vertical or horizontal lines, and so on.

Various additional features may also be provided to further simplify the assignment and scheduling of activities. In an embodiment, a highlighted column 252 is provided to highlight the possible time window within which an activity may be scheduled. If an activity is selected (e.g., an activity in Unplanned Activities frame 260, or possibly a box in Planned Activities frame 230), the information related to the time constraints or restrictions for the activity is extracted. The time constraints may be defined by the date and time values provided in a No Sooner Than field and a Due field. Highlighted column 252 is then adjusted in width and/or moved to the proper location on the chart based on the values in these fields.

In an embodiment, if the values in both fields fall within the displayed portion of the chart, they define highlighted column 252 (e.g., such as that shown under "7/15/98" in frame 230). If only one field value falls within the displayed portion, highlighted column 252 extends to the opposite end of the display. In an embodiment, if both values are null or fall outside the displayed portion, no highlighted column 252 appears. In an alternative embodiment, if both values fall outside the displayed portion, frame 230 is refreshed to include the appropriate calendar, and highlighted column 252 appears in the refreshed display.

The values for the No Sooner Than and Due fields may further impact the appearance of Planned Activities frame 230. The chart may automatically position itself at the right date based on the values for these fields, and the time scale for the chart may also be adjusted, if appropriate.

As shown in FIG. 2, highlighted column 252 is implemented with a particular color (e.g., white) that is different from the base color of the data cells. This visually sets the highlighted column apart in the chart, and allows the dispatcher to quickly and accurately schedule activity. As also shown in FIG. 2, the colored boxes corresponding to assigned and scheduled activities and other events (e.g., un-schedulable times) are brought to the foreground with respect to the highlighted column, which allows the dispatcher to easily visualize restricted cells in which the activity cannot be assigned and scheduled due to conflicts.

Although not shown in FIG. 2, the cells covered by highlighted column 252 may be highlighted with different colors to denote different assignment possibilities. For example, cells in which an activity cannot be assigned for any number of reasons may be shown with one color (e.g., red), and cells in which the activity may be assigned may be shown with another color (e.g., green).

Multiple highlighted columns may also be provided and are within the scope of the invention. Multiple highlighted columns may be used, for example, if there are discontinuous time restrictions associated with an activity.

In an embodiment, if the activity selected for assignment and scheduling is associated with a time window not displayed in the chart, the dispatch system retrieves the scheduling information for that time period, refreshes frame 230, and moves highlighted column 252 to the appropriate location of the grid.

As noted above, activities are typically assigned and scheduled based on a set of parameters (e.g., territory, skill, parts, and so on). The parameters may be specifically defined for the application in which the dispatch system is used, and may be customized (e.g., defined by the dispatcher) via the Option menu used to configure the dispatch menu and dispatch application.

For some of the parameters, a number of categories and/or a number of levels may be defined. For example, the skill parameter may be defined to include categories for language skill (e.g., English, Spanish, and so on), product knowledge (e.g., UNIX, DOS, and others), expertise level (e.g., expert, certified). For assignment and scheduling, certain parameters, or certain categories, or any combination thereof, may be ignored (i.e., selectively enabled and disabled).

Figure 4A:
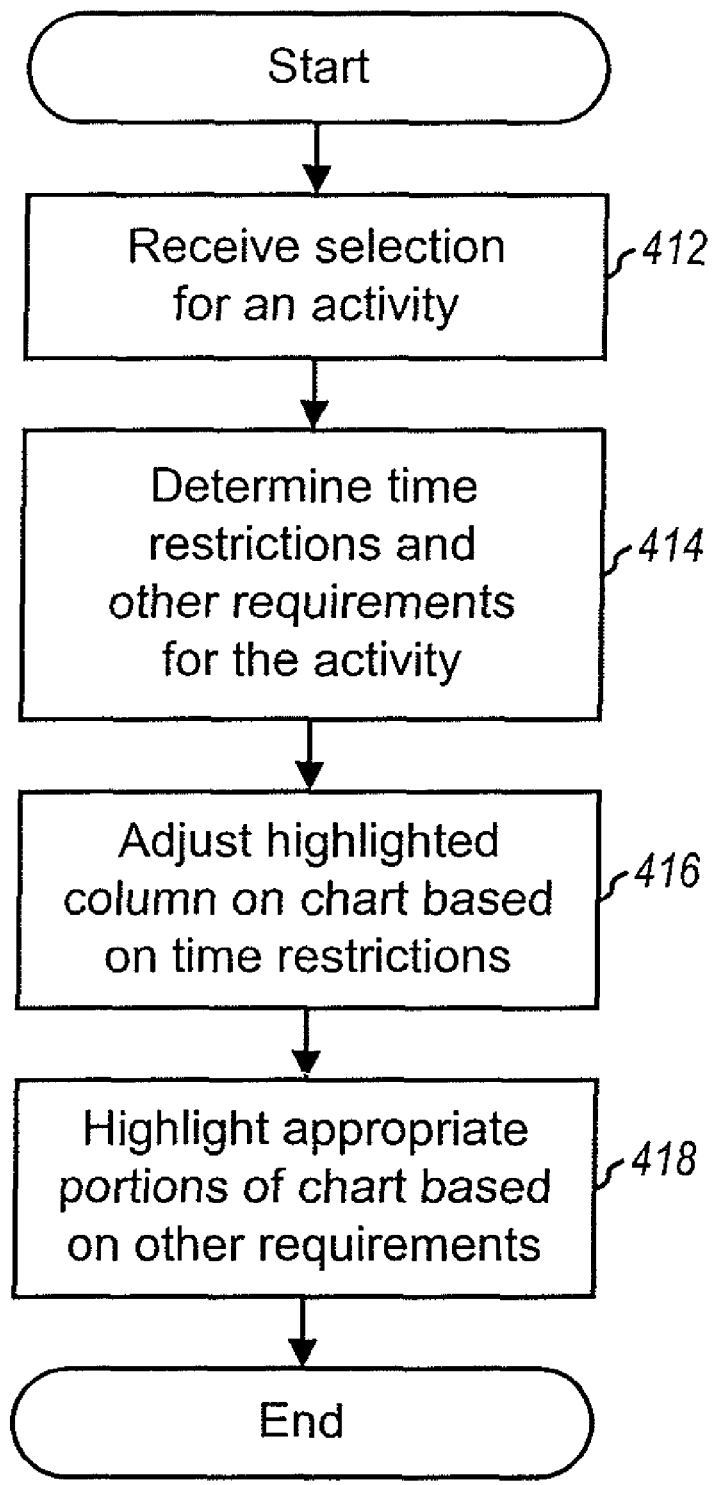
FIGS. 4A and 4B are flow diagrams of processes performed in response to a selection of an activity and a drop of the activity on a data cell, respectively.

FIG. 4A is a flow diagram of a process performed in response to a selection of an activity, in accordance with an embodiment of the invention. Initially, a section for an activity is received, at step 412. The selected activity may be an unplanned activity in Unplanned Activities frame 260 or a planned activity in Planned Activities frame 230. The time restrictions or constraints associated with the selected activity and other requirements are the determined, at step 414. These requirements may relate to the location where the activity is to be performed, the required skill, the required parts, and so on.

Highlighted column 252 is then adjusted and/or moved based on the determined time restrictions, or may be hidden, at step 416. Other portions of the chart may also be impacted based on the determined requirements, at step 418. For example, field service personnel qualified to perform the activity may be highlighted, the grid portion of the chart may be refreshed to show a new calendar for a new time period corresponding to the activity's time restrictions, and so on.

Figure 4B:
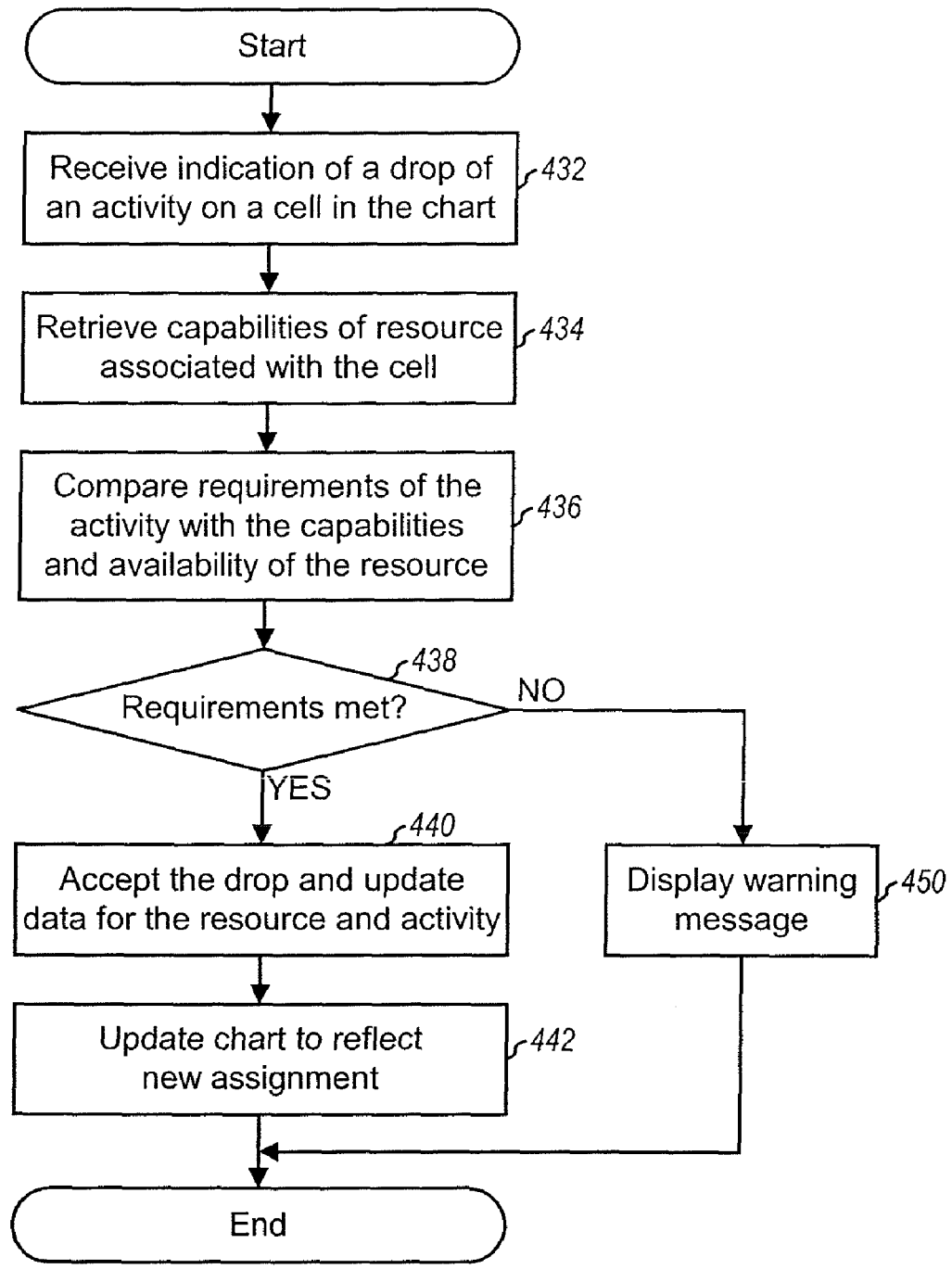

FIG. 4B is a flow diagram of a process performed in response to a drop of an activity on a data cell, in accordance with an embodiment of the invention. Initially, an indication that an activity has been dropped in the data cell is received, at step 432. Capabilities of the resource (i.e., field service personnel) associated with the data cell are then retrieved, at step 434. Such capabilities may include the personnel's skill, parts inventory, territory, available times, and so on. The requirements of the activity (determined in step 414) are then compared against the capabilities and availability of the resource, at step 436.

If the requirements are determined to be met by the resource, at step 438, then the drop is accepted and data for the resource and activity is updated, at step 440. In this manner, the activity can both assigned and scheduled concurrently. The available times of the field service personnel, the parts inventory, and other fields may be updated based on the scheduled activity. The chart in Planned Activities frame 230 and the tree control in Unplanned Activities frame 260 may also be updated to reflect the assignment and scheduling of the activity, at step 442. For example, a color box may be generated and placed in the appropriate data cell(s) in the chart, the activity may be removed from frame 260, and so on.

Back at step 438, if the activity's requirements cannot be met by the resource, a warning or an error may be displayed, at step 450. Additionally or alternatively, the drop may be refused (not released), in which case the dispatcher may try to drop the activity in another data cell or back in its original location. In an embodiment, the dispatcher is provided with an option to override a rejected drop and may be able manually assign and schedule the activity.

Deassignment and Descheduling

An assigned and scheduled activity may be quickly and easily reassigned, rescheduled, removed, deassigned, descheduled, or otherwise modified. Reassigning and/or rescheduling an activity may be easily achieved by selecting the box for the activity (by depressing on the mouse button), dragging the box to another location of the chart (by moving the mouse), and reassigning and/or rescheduling the activity (by releasing the mouse button). Thus, via a simple drag-and-drop action, the dispatcher is able to reassign and/or reschedule any activity from anywhere in the chart (i.e., any row/column) to any other location.

An assigned and scheduled activity may also be quickly and easily deassigned and descheduled by simply selecting the associated box in Planned Activity frame 230 and dragging and dropping it in Unplanned Activity frame 260. An activity may be dragged from frame 230 and dropped in frame 260 for any number of reasons such as, for example, to undo an incorrect or impractical assignment and/or scheduling.

In an embodiment, the dispatcher may also modify the assignment and/or scheduling of an activity by invoking an All Activities view. The dispatcher can undo the scheduling of an activity by deleting the contents of a Planned Start field and/or a Planned Completion field, as appropriate, or to reschedule by providing new values for these fields. The dispatcher may also change the assignment of an activity by changing the value in an Assigned To field on the All Activities view. If the dispatch system provides "Unassigned" as one of the pick-list values for this field or has defined one or more values to represent activities in one or more to-be-assigned queues, the dispatcher can effectively undo an assignment by selecting any such value to replace the name of the previously assigned field service personnel.

Viewing Information in the Planned Activities Frame

Planned Activities frame 230 in FIG. 2 typically displays only a portion of the data available in the main database. The particular portion to be displayed may be selected by the dispatcher. For example, frame 230 may be directed to display only information for the field service personnel located within a particular territory (e.g., the Bay Area). The dispatcher may view additional information for other territories by selecting the desired territory in list box 234a and clicking on refresh button 232. Alternatively, the refresh may be automatically performed by the dispatch system whenever a new territory is selected. As another example, the dispatcher may desire to view information for field service personnel having a particular skill. The desired skill may be selected via list box 234c, and the frame may be refreshed to display the selected information.

The dispatcher may also view information for a particular time window by moving cursors 238a and 238b located at the bottom of the chart, or by entering via the Option menu the desired time window for the calendar to be displayed.

In an embodiment, to enhance performance, the dispatch system does not refresh the contents of frame 230 immediately in response to every selection from a drop-down list 234, but only refreshes when the dispatcher clicks on Refresh button 232. An auto-refresh capability may also be provided and enabled, with selectable time interval between refreshes.

The time interval (e.g., a particular number of minutes) may be entered via the Option menu. Once refreshed, the chart displays in the header column the names (e.g., in alphabetic order) of all field service personnel who have not been disqualified by any of the values for the selected fields.

For each field service personnel, frame 230 shows all planned activities and all designated non-working time for the visible portion of the calendar shown in the chart. The calendar itself may be scrolled right and left (e.g., via scroll bar 236 and/or cursors 238 located near the bottom of frame 230) and possibly up and down (e.g., via another scroll bar and cursors located to the right of frame 230, which are not shown in FIG. 2), if necessary for longer lists of field service personnel. The calendar may cover, for example, an entire week (i.e., 168 hours) of which only 84 hours are shown by the example in FIG. 2.

Additional information may be presented in the dispatch screen via simple mouse actions. For example, placement of the mouse over an activity box causes the dispatch system to display a small window (or bubble) with a summary of the activity, as shown in FIG. 3B. A double-click on the activity box invokes the All Activities view, which propagates the data for the selected activity to a detailed frame opened for this view. Placement of the mouse over the name of a field service personnel causes the dispatch system to display a small window with a summary of the personnel, as shown in FIG. 3A. A single-click on the name of a field service personnel causes the dispatch system to display an Employee view (including Skills, Tools, and Parts), with its fields set to match the information for the selected field service personnel. This view may be invoked to provide the dispatcher with a variety of helpful information about the field service personnel, such as a list of all activities assigned to the field service personnel but not yet scheduled. This list augments the dispatch screen, because activities in this status are neither planned (i.e., both assigned and scheduled) nor unplanned (i.e., unassigned and unscheduled). The dispatcher may also change the information provided in the Employee view. The hierarchical display in the dispatch menu may also be drilled down in order to view additional information useful in deciding how to assign and perhaps schedule activities. In an embodiment, a double-click on the name of a field service personnel causes a popup menu to be displayed, and the dispatcher may also change the information in the popup menu.

In an embodiment, non-working times are displayed on frame 230 in read-only mode, and are derived from the shifts assigned to the field service personnel. Any changes may be made using the Application Administration or Employee view.

Configurable Menu and Views

To provide a custom dispatch screen, various features of the views and frames may be configurable based on the preferences of the individual dispatcher. The configuration settings for the dispatcher may be saved in a file, which may be recalled at a later time. In this manner, a number of dispatchers may operate the dispatch system and are able to quickly recall the settings that match their preferences.

The time period covered by the chart may be set or adjusted. The time period may be measured in number of days, and a default value (e.g., one week) may be used if one is not specified. The time period may also be adjusted automatically, for example, based on the duration of the activity. An activity requiring a longer scheduled time may result in a longer time period for the calendar being displayed in the chart.

The color scheme used for the chart may also be customized. For example, different colors may be used to represent different types of events in the chart (e.g., different activity types), priorities (e.g., urgent, regular), status (e.g., not yet started, pending, completed), and so on. The color scheme may also be selectable and defined by the individual dispatcher.

The menu and view settings may be customized via the Option menu activated by an Option tab.

Implementation of Dispatch System

Figure 5:
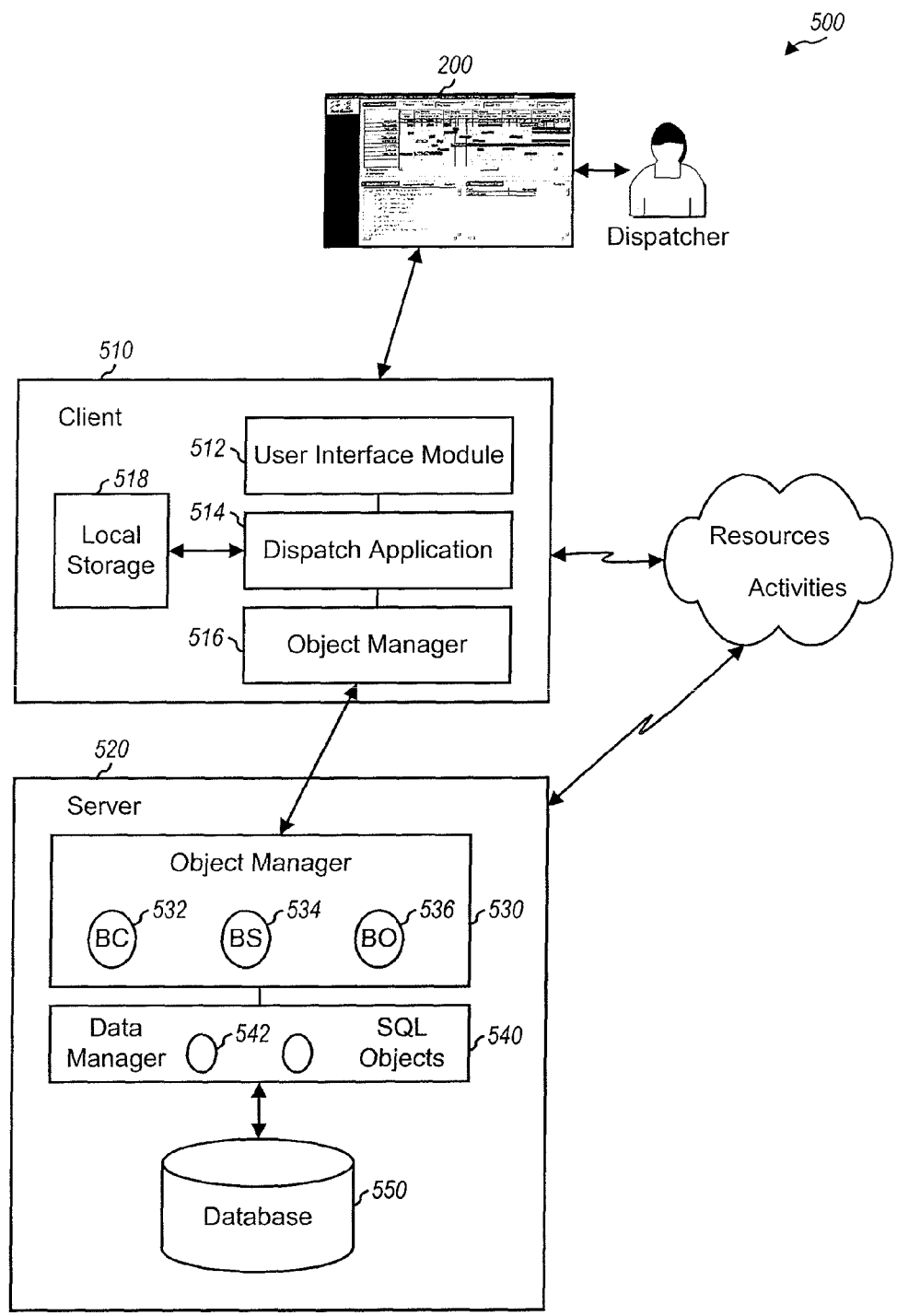
FIG. 5 is a diagram illustrating a logical view of a system in which the dispatch system of the invention may be implemented.

FIG. 5 is a diagram illustrating a logical view of a system 500 in which the dispatch system of the invention may be implemented, in accordance with an embodiment of the invention. System 500 includes a client 510 that interacts with an application server 520. Client 510 provides the functionality of the dispatch system, and server 520 implements the database that stores the data required by client 510. In a distributed design such as shown in FIG. 5, client 510 and server 520 are implemented with two or more computer systems. Alternatively, for an integrated design, client 510 and server 520 may be implemented with one computer system.

In the embodiment shown, client 510 includes a user interface module 512, a dispatch application 514, an object manager 516, and a local storage 518. User interface module 512 provides the dispatch screen based on the data provided by dispatch application 514. User interface module 512 further receives and interprets user commands and data, which may be provided via mouse clicks, mouse movements, keyboard inputs, and other means. User interface module 512 then provides the received data and commands to dispatch application 514, which performs the appropriate responsive action.

Dispatch application 514 performs many of the functions for the dispatch system. These functions typically include (1) interacting with user interface module 512 to provide the necessary data in the proper format and views on the dispatch screen and to receive user commands and data, (2) interacting with local storage 518 to retrieve and/or store data, (3) interacting with server 520 to request updates of data between local storage 518 and database 550, and others. Dispatch application 514 receives user interaction via the dispatch screen and accordingly updates the data in local storage 518 and/or the dispatch screen.

Object manager 516 interacts with object manager 530 within server 520 to exchange data between local storage 518 and database 550.

Local storage 518 stores data that may be presented in the dispatch screen. The data stored in local storage 518 may be a portion of the available data in database 550 for the dispatch application. However, since the access time of database 550 may be relatively long, local storage 518 functions as a "cache" having a faster access time. Local storage 518 may be implemented with random access memory (RAM), a hard disk, other storage technology, or a combination thereof.

Data is retrieved from local storage 518, as needed, and provided to user interface module 512 for display. Data in local storage 518 is also updated based on interaction via the dispatch screen. For example, activities may be updated to reflect their assignment and scheduling, and resources (e.g., field service personnel, parts, and so on) may also be updated to reflect the assignment and scheduling. The data in local storage 518 is also updated with data from database 550 as needed or requested. The dispatcher may update to the current data in database 550, e.g., by clicking on the Refresh buttons provided in many of the frames. The data in local storage 518 may also be updated if the desired data (e.g., for a particular time period) is not available in the local storage. After each update, the data in local storage 518 approximately matches the data in database 550.

The "raw" data from database 550 is typically processed to provide data for the chart and other frames in the dispatch screen. In an embodiment, local storage 518 is designed to store the processed data (as oppose to the raw data). The storage of processed data reduces delay in updating the dispatch screen.

In an embodiment, application server 520 includes an object manager 530 and a data manager 540. Object manager 530 also interacts with data manager 540, which manages database 550.

Object manager 530 manages the interaction with the database, and in an embodiment includes business objects (BO) 532, business services (BS) 534, and business components (BC) 536 (only one of each is shown in FIG. 5 for simplicity). Business objects 532 model major entities (e.g., activities) in the dispatch application with associated business rules. Each business object 532 is made up of a hierarchy of parent-child components, which model relationship with appropriate specialized operations. Business services 534 are the basic components for building complex behavior. New business services 534 may be created and linked into multi-step control flows to provide complex behavior encompassing multiple business objects. And business components 536 provide real time access to remote objects without replication of data within database 550. A business object 532 may be made up of business components 536 managed by the dispatch application.

Data manager 540 manages database 550 and performs this function by invoking SQL objects 542. Database 550 stores all data related to the dispatch application, and possibly for other applications that may be combined with the dispatch application to provide the overall application.

In another embodiment, local storage 518 is implemented within server 520. In this embodiment, object manager 516 is not included in client 510 and dispatch application 514 interfaces directly with object manager 530 in server 520. Various other designs can also be implemented and are within the scope of the invention.

In an embodiment, dispatch application 514 is implemented using C++. However, other programming languages and software tools may also be used and are within the scope of the invention. Dispatch application 514 includes a number of classes, with each class including a number of class objects designed to perform specific functions.

Dispatch application 514 may be implemented to include a Frame class, a (Gantt) Chart class, an Activity Chart class, and an Unplanned Activity class. Other classes may also be provided but are not described herein for simplicity. For example, standard Business Component class may be provided in the base software to retrieve data. The Frame class renders a frame as directed by dispatch application 514. The Chart class renders a chart (such as that shown in FIG. 2) within a rendered frame using the data provided by dispatch application 514. The Activity Chart class generates chart objects in local storage 518. This typically entails interacting with application server 520, fetching data based on the dispatcher's preference, and generating the chart objects based on the fetched data. The Chart class is a member of the Activity Chart class that also handles the drag-and-drop features and the scrolling for the chart. The Unplanned Activity class is an Unplanned Activities explorer applet that renders the tree in Unplanned Activities frame 260. This class handles the drag and drop and interactions with Activity Chart class.

The Frame class may be implemented with the following:

OnLButtonDown—Set the activity box as current or selected activity. Register the drag source and mark the initiation of Drag.

The Chart class may be implemented with the following:

DoPasteItem—Validate if the insertion of an activity at the place indicated is valid in relation to the time window constraints. If it is not a valid location to accept the activity, then provide appropriate error message. Else set the new attributes for the activity to reflect its new assignment and schedule and write the data to the database. Based on the drag source, refresh only the chart or all the frames.

AcceptDragObject—Identify the type of the object being dragged over and returns the drag source.

AcceptDropHere—Indicate that the drop or an object has been accepted.

OnDragOver—If the mouse is placed over a data cell, then display the current position by drawing a rectangle on that cell and removing the rectangle from previous cell.

OnDragLeave—Undraw the focus rectangle from the previous cell.

The Unplanned Activity class may be implemented with the following:

AcceptDropObject—Identify the type of the object being dragged over and returns the drag source.

AcceptDropHere—Indicate that the drop of an object has been accepted.

OnDragOver—Display the drag effect if an object which is dragged over is one of the acceptable objects.

DoPasteItem—Set the new attributes for the activity to make it unscheduled and unassigned and write the data to the database. Refresh all the frames.

Figure 6:
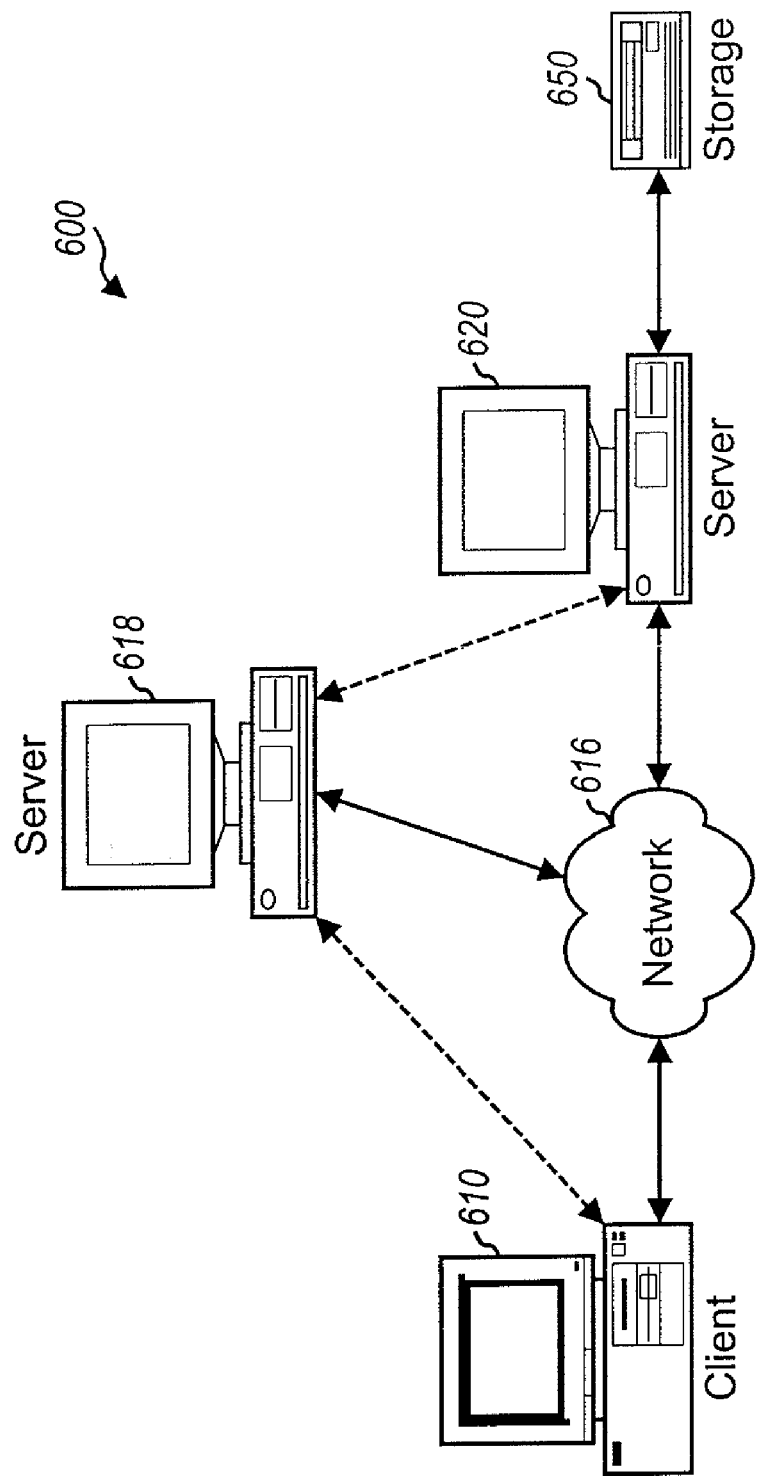
FIG. 6 is a diagram illustrating a physical view of a system capable of implementing the dispatch system.

FIG. 6 is a diagram illustrating a physical view of a system 600 capable of implementing the dispatch system, in accordance with a specific embodiment. System 600 includes a client 610 coupled to an application server 620 via a computer network 616 (e.g., the Internet, an intranet, or some other network). One or more other servers 618 may also couple to network 616, or may couple directly to client 610 and/or server 620 (as shown by the dashed lines). Client 610 and server 620 may be designed to implement client 510 and server 520 in FIG. 5, respectively, and would then include the elements needed to implement the respective functions. Client 610 would thus include the program codes and hardware to implement user interface module 512, dispatch application 514, and local storage 518. Similarly, server 620 would include the program codes needed to implement object manager 530 and data manager 540.

Server 618 may be a source that provides information for activities and/or resources to the dispatch application, and may be a part of a call center, an Internet portal, or some other system. Server 618 may interact with customers and generate activities. A call may result in one or multiple activities being generated. Server 618 may also provide reporting capability for the dispatch system, and may be used to inform customers and/or personnel of the assignments and scheduled times for the activities.

In a distributed system, multiple clients 610 and multiple servers 620 may be interconnected. In this case, appropriate coordination is provided to ensure that the data is properly maintained and updated.

Figure 7:
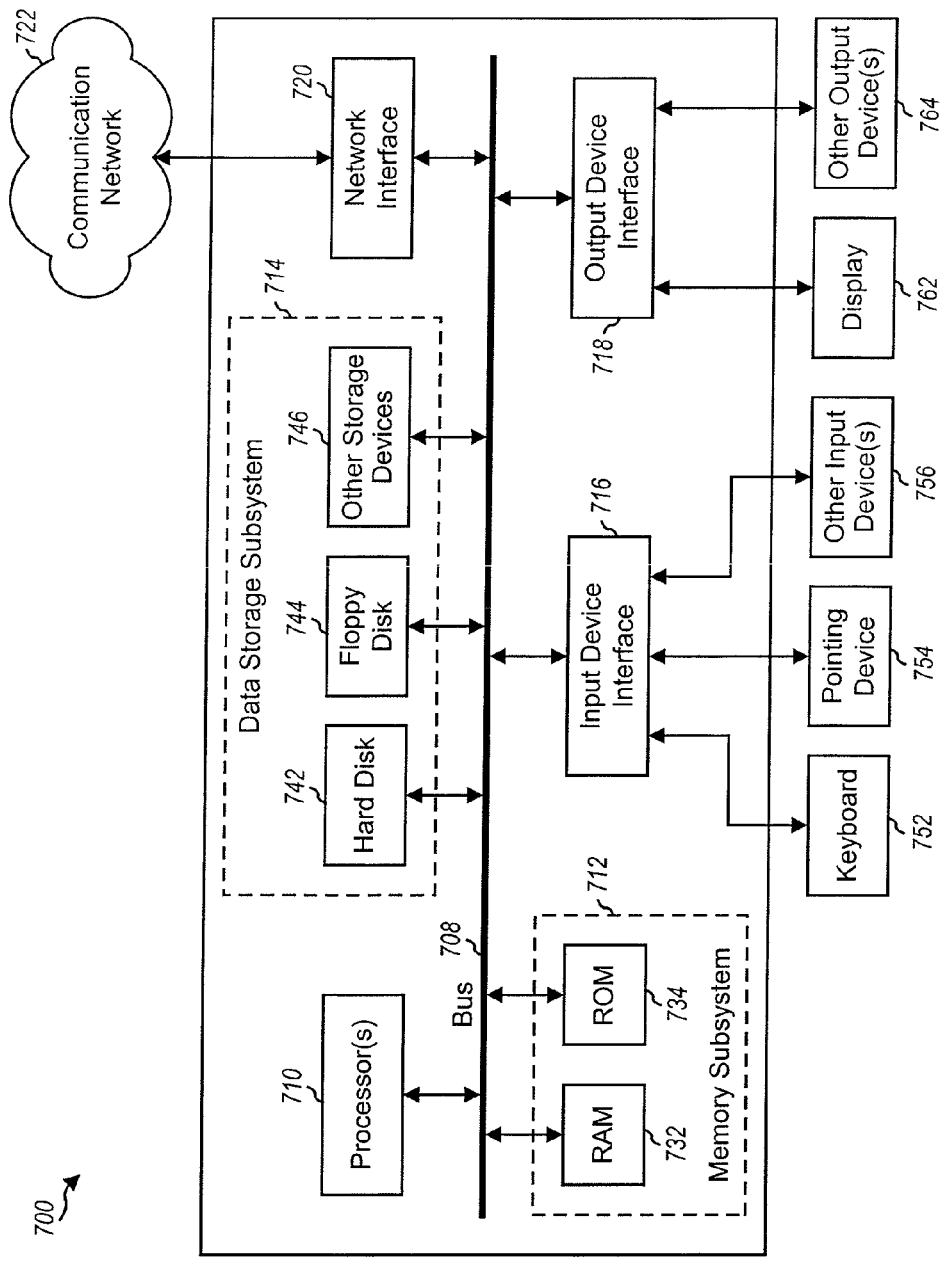
FIG. 7 is a block diagram of a computer system.

FIG. 7 is a block diagram of an embodiment of a computer system 700 that may be used to implement client 610, server 618, and server 620 in FIG. 6. As shown in FIG. 7, system 700 includes a bus 708 that interconnects major subsystems such as one or more processors 710, a memory subsystem 712, a data storage subsystem 714, an input device interface 716, an output device interface 718, and a network interface 720.

Bus 708 provides a means for allowing various components and subsystems of system 700 to communicate with each other. Many of the subsystems and components of system 700 need not be at the same physical location but may be distributed at various locations throughout a communication network. Although bus 708 is shown in FIG. 7 as a single bus, alternate designs for bus 708 may include multiple busses.

Processor(s) 710 perform many of the processing functions for system 700 and communicate with a number of peripheral devices via bus 708. Memory subsystem 712 and data storage subsystem 714 store the program codes and data that implement various aspects of the invention and further provide the functionality of system 700. These program codes and data are then provided to memory subsystem 712 and the codes are executed by processor(s) 710. In a distributed environment, the program codes and data may be stored on a number of computer systems and used by the processors of these systems.

Memory subsystem 712 typically includes a number of memories including a random access memory (RAM) 732 and a read only memory (ROM) 734. RAM 732 is typically used to store codes and data during program execution and ROM 734 is typically used to store fixed codes and data.

Data storage subsystem 714 provides persistent (non-volatile) storage for program codes and data, and may include a hard disk drive 742, a floppy disk drive 744, and other storage devices 746 such as a compact digital read only memory (CD-ROM) drive, an optical drive, and removable media cartridge disk drive. Each of the storage devices may be associated with removable media (e.g., floppy disks, CD-ROMs, cartridges). One or more of the storage devices may be located at remote locations and coupled to system 700 via communication network 722.

Input device interface 716 provides interface with various input devices such as a keyboard 752, a pointing device 754 (e.g., a mouse, a trackball, a touch pad, a graphics tablet, a scanner, or a touch screen), and other input device(s) 756. In general, the term "input device" is intended to include all possible types of devices and ways to input information into system 700. Via the input devices, the dispatcher is able to select and move activities using the drag-and-drop technique, refresh frames, update data, and perform many other functions.

Output device interface 718 provides an interface with various output devices such as a display 762 and other output device(s) 764. Display 762 may be a cathode ray tube (CRT), a flat-panel device such as a liquid crystal display (LCD), or some other visual devices. In general, the term "output device" is intended to include all possible types of devices and ways to output information from system 700 to a human or to another machine or computer systems. Via the output devices, the dispatcher is provided with the dispatch screen and other menus.

Network interface 720 provides an interface with outside networks including communication network 722. Through network interface 720, system 700 is able to communicate with other computer systems coupled to communication network 722. Network interface 720 may provide a wireline or wireless interface to communication network 722.

Many other devices or subsystems (not shown) may also be coupled to system 700. In addition, it is not necessary for all of the devices shown in FIG. 7 to be present to practice the invention. Furthermore, the devices and subsystems may be interconnected in configurations different from that shown in FIG. 7. The operation of a computer system such as that shown in FIG. 7 is readily known in the art and not described in detail herein. The source codes to implement some embodiments of the invention may be operatively disposed in memory subsystem 712 or stored on storage media such as a hard disk, a floppy disk, or a CD-ROM that is operative with a CD-ROM player.

The foregoing description of the specific embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein, and as defined by the following claims.

What is claimed is:

1. A method comprising:
   receiving a selection of an activity;
   providing on a display screen a plurality of selectable search criteria for use in a search function for identifying one or more personnel that are eligible for fulfilling the selection, wherein the selectable search criteria comprise one or more skill requirements of the one or more personnel;
   automatically selecting skill requirements using search criteria associated with the activity, wherein the automatically selected skill requirements are required to perform the activity;
   receiving a selection of a manually selected skill requirement;
   providing on a display screen a chart showing at least a plurality of personnel that satisfy both the automatically selected skill requirements and the manually selected skill requirement; and
   highlighting a first set of objects on the chart based at least in part on time restrictions for the activity.

2. The method of claim 1, wherein the highlighting comprises providing a highlighted column in the chart indicative of a time window meeting the time restrictions for the activity.

3. The method of claim 1, comprising:
   displaying objects on the chart representative of previously assigned and scheduled activities.

4. The method of claim 1, comprising:
   displaying objects on the chart representative of non-schedulable times for the plurality of personnel.

5. The method of claim 4, wherein objects for schedulable and non-schedulable times in the chart are coded with different colors.

6. The method of claim 1, comprising:
   highlighting a second set of objects on the chart based on one or more requirements for the activity.

7. The method of claim 1, wherein the chart is a Gantt chart.

8. The method of claim 1, wherein the selection of the activity is received via a mouse click on an object in the display screen representative of the activity.

9. The method of claim 1, wherein the search criteria comprise employee, time, parts, and territory.

10. The method of claim 1, comprising:
    highlighting a second set of objects on the chart based at least in part on the automatically selected skill requirements and on the manually selected skill requirement, wherein
    the first set of objects represent suitable time slots for the activity, and
    the second set of objects represent the personnel that satisfy both the automatically selected skill requirements and the manually selected skill requirement.

11. A system comprising:
    a processor; and a memory coupled to the processor, wherein the memory comprises instructions configured to cause the processor to perform acts comprising receiving a selection of an activity;

providing on a display screen a plurality of selectable search criteria for use in a search function for identifying one or more personnel that are eligible for fulfilling the selection, wherein the selectable search criteria comprise one or more skill requirements of the one or more personnel;

automatically selecting skill requirements using search criteria associated with the activity, wherein the automatically selected skill requirements are required to perform the activity;

receiving a selection of a manually selected skill requirement;

providing on a display screen a chart showing at least a plurality of personnel that satisfy both the automatically selected skill requirements and the manually selected skill requirement; and highlighting a first set of objects on the chart based at least in part on time restrictions for the activity.

12. The system of claim 11, wherein the highlighting comprises providing a highlighted column in the chart indicative of a time window meeting the time restrictions for the activity.

13. The system of claim 11, wherein the instructions are configured to cause the processor to perform acts comprising:
displaying objects on the chart representative of previously assigned and scheduled activities.

14. The system of claim 11, wherein the instructions are configured to cause the processor to perform acts comprising:
displaying objects on the chart representative of non-schedulable times for the plurality of personnel.

15. The system of claim 14, wherein objects for schedulable and non-schedulable times in the chart are coded with different colors.

16. The system of claim 11, wherein the instructions are configured to cause the processor to perform acts comprising:
highlighting a second set of objects on the chart based on one or more requirements for the activity.

17. The system of claim 11, wherein the chart is a Gantt chart.

18. The system of claim 11, wherein the selection of the activity is received via a mouse click on an object in the display screen representative of the activity.

19. The system of claim 11, wherein the search criteria comprise employee, time, parts, and territory.

20. An article of manufacture comprising:
a non-transient computer-readable storage medium having instructions encoded thereon, wherein the instructions are executable by a processor to perform acts comprising receiving a selection of an activity;

providing on a display screen a plurality of selectable search criteria for use in a search function for identifying one or more personnel that are eligible for fulfilling the selection, wherein the selectable search criteria comprise one or more skill requirements of the one or more personnel;

automatically selecting skill requirements using search criteria associated with the activity, wherein the automatically selected skill requirements are required to perform the activity;

receiving a selection of a manually selected skill requirement;

providing on a display screen a chart showing at least a plurality of personnel that satisfy both the automatically selected skill requirements and the manually selected skill requirement; and highlighting a first set of objects on the chart based at least in part on time restrictions for the activity.

21. A system comprising:

means for receiving a selection of an activity;

means for providing on a display screen a plurality of selectable search criteria for use in a search function for identifying one or more personnel that are eligible for fulfilling the selection, wherein the selectable search criteria comprise one or more skill requirements of the one or more personnel;

means for automatically selecting skill requirements using search criteria associated with the activity, wherein the automatically selected skill requirements are required to perform the activity;

means for receiving a selection of a manually selected skill requirement;

a processor configured for providing on a display screen a chart showing at least a plurality of personnel that satisfy both the automatically selected skill requirements and the manually selected skill requirement; and means for highlighting a first set of objects on the chart based at least in part on time restrictions for the activity.

* * * * *

UNITED STATES PATENT AND TRADEMARK OFFICE
CERTIFICATE OF CORRECTION

PATENT NO. : 8,365,095 B2
APPLICATION NO. : 12/871548
DATED : January 29, 2013
INVENTOR(S) : Bansal et al.

Page 1 of 1

It is certified that error appears in the above-identified patent and that said Letters Patent is hereby corrected as shown below:

In the Specifications:

In column 16, line 26, delete "DoPasteItem—Set" and insert -- DoPasteItem—Set --, therefor.

Signed and Sealed this
Fourteenth Day of May, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,365,095 B2 | Page 1 of 1 |
| APPLICATION NO. | : 12/871548 | |
| DATED | : January 29, 2013 | |
| INVENTOR(S) | : Bansal et al. | |

It is certified that error appears in the above-identified patent and that said Letters Patent is hereby corrected as shown below:

On the title page, column 1, under item 75 Inventors, line 4, delete "Chrisopher" and insert -- Christopher --, therefor.

Signed and Sealed this
Sixteenth Day of February, 2016

Michelle K. Lee
*Director of the United States Patent and Trademark Office*